United States Patent
Zöllner et al.

(10) Patent No.: US 6,637,788 B1
(45) Date of Patent: Oct. 28, 2003

(54) SAFETY BUMPER COMPRISING AN ENERGY-ABSORBING ELEMENT CONTROLLED BY AN IMPACT SENSOR

(75) Inventors: Olaf Zöllner, Bridgeville, PA (US); Andreas Lang, Lüdenscheid (DE); Thorsten Bredemann, Barcelona (ES)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/959,069

(22) PCT Filed: Apr. 10, 2000

(86) PCT No.: PCT/EP00/03159

§ 371 (c)(1), (2), (4) Date: Jan. 4, 2002

(87) PCT Pub. No.: WO00/64707

PCT Pub. Date: Nov. 2, 2000

(30) Foreign Application Priority Data

Apr. 22, 1999 (DE) .................................. 199 18 202

(51) Int. Cl.$^7$ .................. B60R 19/20; B60R 21/34
(52) U.S. Cl. ............... 293/107; 293/117; 280/728.1
(58) Field of Search .................. 293/107, 108, 293/109, 110, 117; 280/730.1, 728.1

(56) References Cited

U.S. PATENT DOCUMENTS

| | | | | |
|---|---|---|---|---|
| 3,708,194 A | * | 1/1973 | Amit | 293/1 |
| 3,992,047 A | * | 11/1976 | Barenyi et al. | 293/9 |
| 4,770,457 A | * | 9/1988 | Tomforde | 296/180.5 |
| 4,815,777 A | * | 3/1989 | Campbell | 293/107 |
| 5,016,933 A | * | 5/1991 | Smit | 293/117 |
| 5,732,785 A | * | 3/1998 | Ran et al. | 180/271 |
| 5,959,552 A | * | 9/1999 | Cho | 340/903 |

FOREIGN PATENT DOCUMENTS

| | | | | |
|---|---|---|---|---|
| DE | 2455258 A1 | 5/1976 | | |
| DE | 4308021 A1 | 9/1994 | | |
| DE | 10062560 A1 | * 7/2001 | | B60R/21/34 |
| DE | 10031525 A1 | * 1/2002 | | B60R/19/20 |
| EP | 0 768 213 A2 | 4/1997 | | |
| EP | 0 839 690 A2 | 5/1998 | | |
| EP | 1024063 A2 | * 8/2000 | | B60R/21/34 |
| FR | 2474982 | 8/1981 | | |
| GB | 2311966 A | 10/1997 | | |
| GB | 2336572 A | 10/1999 | | |
| JP | 2001322518 A | * 11/2001 | | B60R/21/00 |

OTHER PUBLICATIONS

**Patent Abstracts of Japan, vol. 014, No. 384 (M–1013), Aug. 20, 1990 & JP 02 144246 A (Mazda Motor Corp; Others: 01) Jun. 4, 1990.

* cited by examiner

Primary Examiner—Joseph D. Pape
Assistant Examiner—Patricia Engle
(74) Attorney, Agent, or Firm—Joseph C. Gil; Aron Preis; James R. Franks

(57) ABSTRACT

The safety bumper includes: (a) a bumper basic body (4) having a forward surface; (b) a bumper bar (5); (c) a mounting member (11); (d) a cross-bar (10) of the vehicle, (e) at least one of a deployable energy-absorbing element (9; 32, 33, 39, 41; 52, 60) positioned above the mounting member (11) and a deployable energy-absorbing element (17, 20; 38, 46; 64) positioned below mounting member (11); and (f) an impact sensor (6) located in bumper bar (5). The bumper bar (5) is connected to bumper basic body (4) and extends through to the forward surface of bumper basic body (4), bumper bar (5) is also connected to mounting member (11), and mounting member (11) is located behind bumper basic body (4) and bumper bar (5). The mounting member (11) is connected to cross-bar (10), which is located behind mounting member (11). The deployable energy-absorbing elements are controlled by impact sensor (6), and upon actuation thereby are deployed and form (either singly or together) a substantially continuous contour and a substantially common front together with the forward surface of bumper basic body (4).

17 Claims, 4 Drawing Sheets

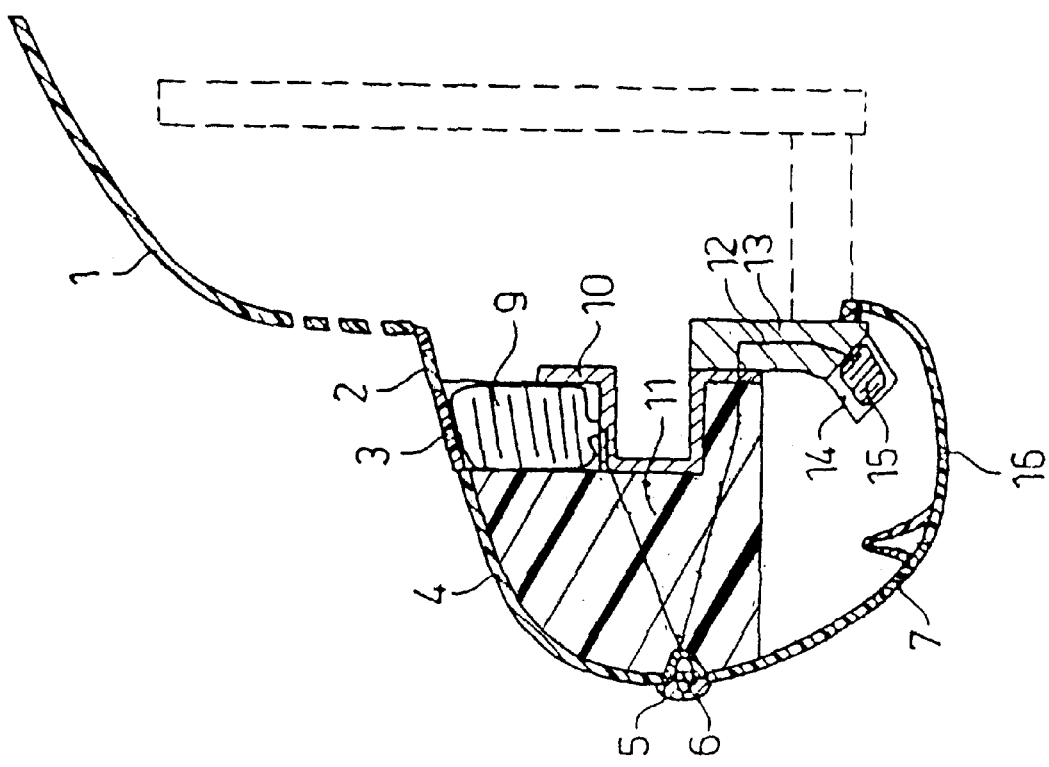

SAFETY BUMPER COMPRISING AN ENERGY-ABSORBING ELEMENT CONTROLLED BY AN IMPACT SENSOR

CROSS REFERENCE TO RELATED PATENT APPLICATIONS

The present patent application claims the right of priority under 35 U.S.C. §119 (a)–(d) and 35 U.S.C. §365 of International Application No. PCT/EP00/03159, filed Apr. 10, 2000, which was published in German as International Patent Publication No. WO 00/64707 on Nov. 2, 2000, which is entitled to the right of priority of German Patent Application No. 199 18 202.7, filed Apr. 22, 1999.

FIELD OF THE INVENTION

The invention relates to a safety bumper system for motor vehicles, in particular for private and commercial vehicles, which is constructionally fashioned in such a way that it meets the requirements of the current pedestrian protection test, e.g. according to the regulations of the European Enhanced Vehicle Safety Committee (EEVC), but at the same time permits external configuration possibilities as in conventional bumper systems.

BACKGROUND OF THE INVENTION

Known bumper systems of private and commercial vehicles endeavour to satisfy various requirements with regard to the absorption of energy in the event of accidents both at low and higher speeds while nevertheless retaining some creative scope for the design. The bumper for the front or tail region of a private vehicle known from EP 768 213 A2 comprises a shock absorber as an energy-absorbing element, which is connected by an easily mountable fastening to the actual bumper and to a covering provided thereon.

From EP 839 690 A2 a bumper system for commercial vehicles is known, which is composed substantially of combined channel section strips, which have special reinforcing elements. Said bumper system is used, on the one hand, to absorb energy in the event of collision with other motor vehicles. On the other hand, with the assembly below an existing bumper an undershoot guard is achieved.

EP 736 420 A2 describes a bumper system for a private vehicle, which has a bumper substantially comprising an energy-absorbing buffer, which is surrounded by a flexible enclosure and which in the event of a collision deforms and in so doing absorbs the kinetic energy.

All known bumper systems are however not capable of meeting the current requirements regarding pedestrian protection in the event of an accident involving pedestrians.

In particular, bumper systems are required to satisfy the requirements e.g. of the EEVC (European Enhanced Vehicle Safety Committee) directive. This states i.a. that the impact of a legform impactor—which recreates the form of the human leg—with a weight of 13.6 kg and at a speed of 40 kph against the front portion of the motor vehicle is to be tested. The acceleration occurring during the test is to be no greater than 150 g/m². The buckling angle of the impactor during the test should not exceed 15° and the shear distance of the impactor parts is to be no greater than 6 mm.

In addition to the pedestrian protection conditions, it is moreover desirable for the bumper system to satisfy the requirements of the 4 kph impact test and the 8 kph impact test.

There is moreover the need for design freedom to be, as far as possible, only slightly restricted by fulfilment of the EEVC requirements. The overall appearance of the motor vehicle is not to be influenced or is to be influenced only minimally by the protection measures.

SUMMARY OF THE INVENTION

It has been discovered that the new bumper systems described below not only pass the 4 kph test (optionally also the 8 kph test) but also meet the above-mentioned pedestrian protection conditions. What is more, by virtue of the invention, design freedom for configuration of the front or rear of motor vehicles is extensively retained.

The subject matter of the invention is a safety bumper for a motor vehicle, in particular for a private vehicle, at least equipped with a bumper basic body plus bumper bar, which is connected by a mounting, in particular by an energy-absorbing module as the mounting, to a cross-bar of the vehicle, characterized in that above the mounting energy-absorbing elements and/or below the mounting energy-absorbing elements are provided, which are controllable by an impact sensor, and after actuation by the impact sensor form above and/or below the bumper basic body a continuous contour with the front side of the bumper basic body.

BRIEF DESCRIPTION OF THE DRAWINGS

FIG. 1c is a sectional representation of a safety bumper similar to that of FIG. 1a, in which the mounting member (11) is a plastic strut body;

DETAILED DESCRIPTION OF THE INVENTION

Figure 1A:
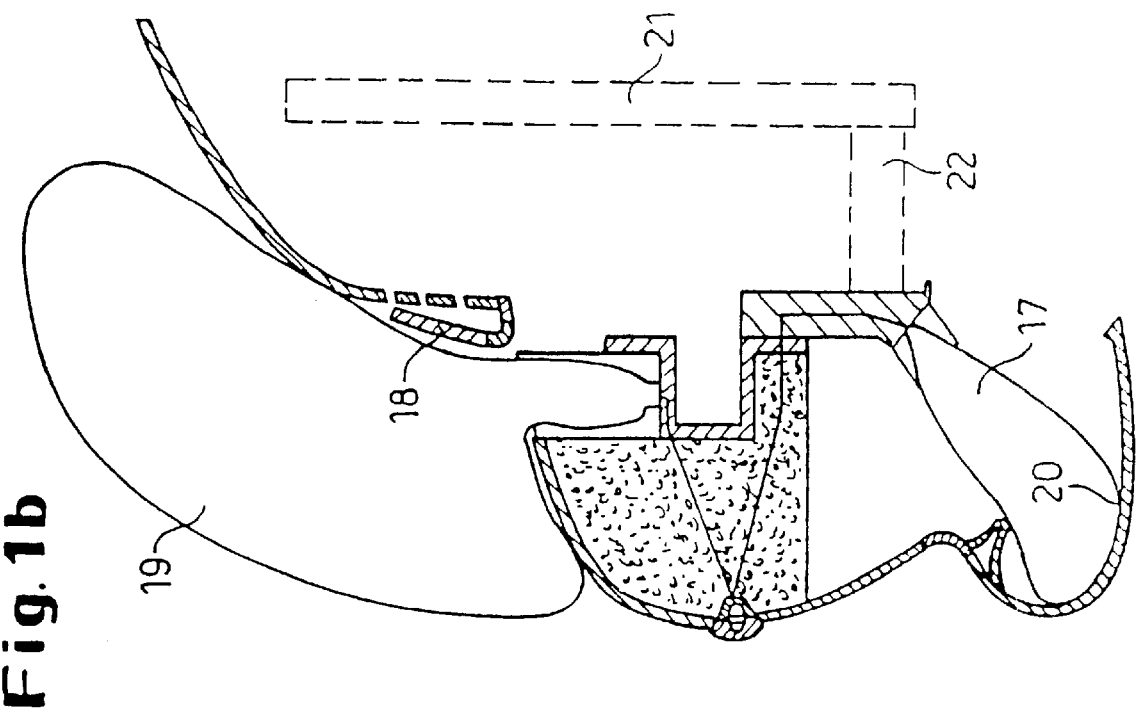
FIG. 1a is a sectional representation of a safety bumper according to the invention.

Here, continuous contour means that in the event of an impact-triggered actuation of the energy-absorbing elements the latter together with the front side of the bumper basic body form a common front, which reduce the buckling angle—in relation to the impact of a standard-leg impactor—and keep it e.g. at less than 15°. This then conforms with the provisions of the initially mentioned guideline of the EEVC.

In a preferred construction, the energy-absorbing element disposed above the mounting is an airbag, which is provided in a folded-up state, preferably under a flap, on or behind the mounting and the igniter of which is electrically connected by the control line to the impact sensor.

In a preferred variant, the energy-absorbing element disposed above the mounting is an airbag, which is provided in a folded-up state, preferably under a movable top flap, on or behind the mounting and the igniter of which is electrically connected by the control line to the impact sensor and which together with the opened top flap after actuation by the impact sensor forms a continuous contour with the front side of the bumper basic body.

A further special variant of the bumper is characterized in that the energy-absorbing element disposed above the mounting is a combination of a top bumper flap, a sliding plate situated below the latter and a lifting system plus drive, wherein the drive is electrically connected by the control line to the impact sensor, and wherein after actuation of the drive by the impact sensor the extended top bumper flap and the extended sliding plate (48) form a continuous contour with the front side of the bumper basic body.

In a preferred construction of the invention, the energy-absorbing element disposed below the mounting is an airbag, which is provided in a folded-up state, preferably below the lowermost part of the bumper, and the igniter of which is electrically connected by the control line to the impact sensor.

A further preferred variant of the bumper is characterized in that the energy-absorbing element disposed below the mounting is an airbag, which is provided in a folded-up state, under a movable bottom flap, and the igniter of which is electrically connected by the control line to the impact sensor and which together with the opened flap after actuation by the impact sensor forms a continuous contour with the front side of the bumper basic body.

In another special form of construction, the energy-absorbing element disposed below the mounting is a combination of a bottom bumper flap, a bottom sliding plate situated below the latter and a bottom lifting system plus drive, wherein the drive is electrically connected by the control line to the impact sensor, and wherein after actuation of the drive by the impact sensor the extended bottom bumper flap and the extended bottom sliding plate form a continuous contour with the front side of the bumper basic body.

The drive for the bottom and/or for the top lifting system is independently of one another in particular a gas pressure cylinder or a hydraulic cylinder.

Instead of the top or the bottom lifting system an airbag system may be provided for moving the top or bottom bumper flap.

The said flaps, the top flap, the top bumper flap, the bottom bumper flap or the bottom flap, which hide the energy-absorbing elements from sight and swing open upon actuation of the sensor, are independently of one another movably connected by a flexible plastic part, in particular made of the material TPE or TPU, to the bumper basic body. Conventional hinges may also be used.

The mounting of the bumper is preferably an energy-absorbing plastic foam body or plastic strut body.

In a particularly preferred manner the energy-absorbing plastic foam body is made of polyurethane foam or thermoplastic foam material, e.g. polystyrene foam or polypropylene foam.

Particular advantages regarding energy absorption upon impact arise when the energy-absorbing elements situated above the mounting and/or the energy-absorbing elements below the mounting are connected by an additional supporting strut to the front end of the motor vehicle.

The essential features of the present invention are: the classic bumper system is extended in a way that both retains design freedom and satisfies pedestrian protection requirements.

In principle, the described safety bumper operates as follows: energy absorption is effected by the outer skin of the bumper system made of plastics material in conjunction with a constructionally fashioned mounting made of plastics material or metal. This may be a foam system or a plastic or metal strut body or a combination of both. Said system is intended to satisfy the requirements regarding the maximum acceleration values.

To satisfy the further requirements regarding pedestrian protection (buckling angle e.g. less than 15° and shear distance e.g. less than 6 mm), a swing-out top and bottom part are provided e.g. above and/or below the mounting in the outer plastic shell.

Said flap mechanism may be realized by a "hard/soft combination" of suitable plastics materials or by the possibilities afforded by the construction and/or material of the outer plastic shell alone (hinge function).

Outward swinging of the top and bottom parts is effected e.g. by means of fundamentally known airbag systems, mechanical lifting apparatuses or pressure cylinders, which are tripped by pressure sensors and/or contact-free sensors (radar, ultrasound, laser or the like). Said sensors should be controlled in particular in a speed-dependent manner. For example, from a vehicle speed of 0 kph up to around 4 kph the sensors do not respond. This serves as a protection against abuse of the airbag systems or against superficial damage.

The flap mechanism may be so designed that the parts involved (flaps) may be reversibly opened and closed a plurality of times.

Materials, which may be considered for the outer bumper shell (front side), are plastics materials which permit a minimum wall thickness with simultaneous retention of the mechanical properties over a wide temperature range. For the less rigid components of the swing-open top and bottom flap mechanisms, TPU (thermoplastic polyurethane) or TPE (thermoplastic elastomer) is recommended.

In order to meet the pedestrian protection requirements, besides the already provided cross-bar additional structural components may be provided for the purposes of support and stiffening. Said additional structural components are preferably realized by plastic/metal composite parts (e.g. of polyamide+sheet metal). In the event of overload, built-in predetermined buckling points provide crash damage protection.

The invention is described in detail below with reference to the drawings.

EXAMPLES

Three examples show various forms of construction of the invention.

Example 1

Bumper System

Figure 1B:
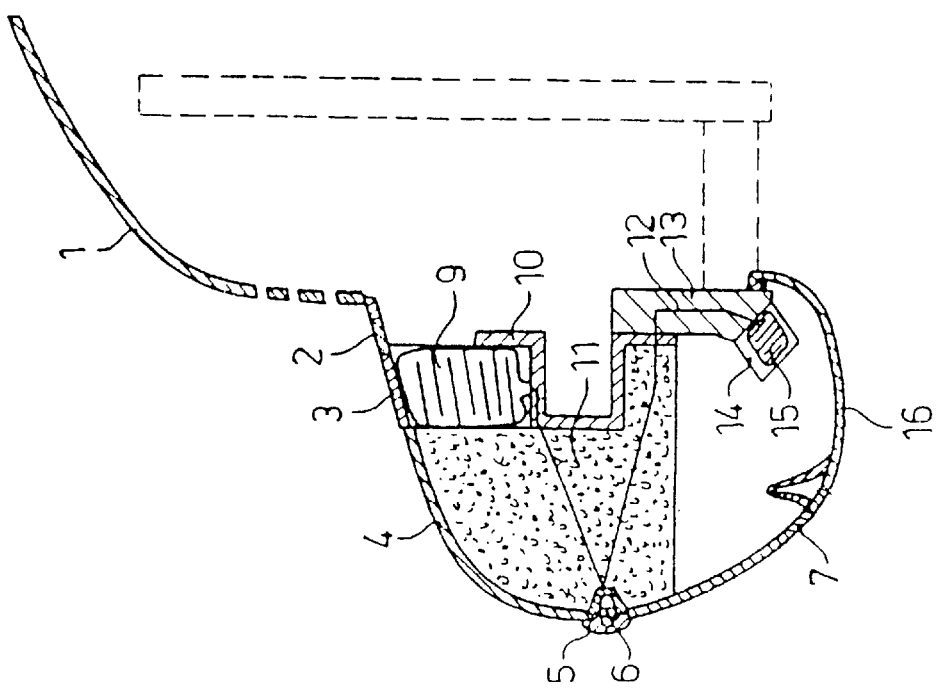
FIG. 1b is a sectional representation of the safety bumper of FIG. 1a after an impact and deployment of the air bags.

FIGS. 1*a* and 1*b* each show a cross section through a safety bumper. Below the bonnet 1 of a private vehicle a part of the outer boundary of the bumper is connected by a hinge 2 to the flap 3. The hinge 2 allows the flap 3 to swing open in the direction of the bonnet 1 (as depicted by folded-back flap 18 of FIG. 1*b*). Selectively, instead of the hinge, a connecting piece 2 made of elastic material, e.g. a two-component compound (a thermoplastic polyurethane: TPU), is provided. A folded-up airbag 9 is provided below the flap 3. The bumper basic body (outer bumper shell) 4 and the bumper bar 5 surround the energy-absorbing module (mounting) 11, a polyurethane foam cushion, and a cavity situated underneath, in which a further airbag case 14 containing airbag 15 is accommodated.

The flap 3, the bumper basic body 4 and the bumper bar 5 are manufactured from a plastics material (polycarbonate/polybuteneterephthalate mixture: PC/PBT) or a polyalcohol formulation. Situated behind the bumper bar 5 is a sensor 6, which via an electronic signal through the line 12 trips the ignition of the airbags 9 and 15 in the event of a collision with the bumper (the igniters of the airbags 9 and 15 are not illustrated here). Situated below the sensor 6 is a further flap 16, which like the top flap is connected by a second hinge 7 to the basic body 4 and which may open in a downward direction.

Swinging-open of the flap 16 is likewise tripped via an airbag 15. The unfolded airbag 17, together with the flap 16 (20 in FIG. 1*b*) and the components 13 and optionally 22, effects the energy absorption in the bottom region of the bumper and reduces the buckling angle and the shear distance of the front of the private vehicle.

The airbag 15 is supported via a plastic/metal composite part 13 and 14 (of polyamide/sheet steel), which in turn is integrated in the cross-bar 10 or at the front end 21 of the car.

The energy absorption in the middle part is effected via a system comprising the basic body 4 and the energy-absorbing foam cushion (EA foam) 11.

In the event of an accident, the unfolded airbag 19 effects the energy absorption in the region above the bumper and considerably reduces the buckling angle.

By means of the flap mechanism in the bottom part and by means of the airbag 19, 17 the buckling angle is kept below 15° and the shear distance is kept at less than 6 mm (see FIG. 1*b*).

For the additional support of the airbag 15 and the transmission of impact energy a further connecting bar 22 may be installed from the airbag 15 to the front end 21 of the car.

In the event of a crash, an anti-overload device in the connecting bar 22 provides protection against the destruction or damage of built-on parts. A buckling point may be provided in the form of a bead in the construction. A further possibility is the reduction of the bar cross section by means of through-holes or reduction of the wall thickness.

Example 2

Figure 2B:
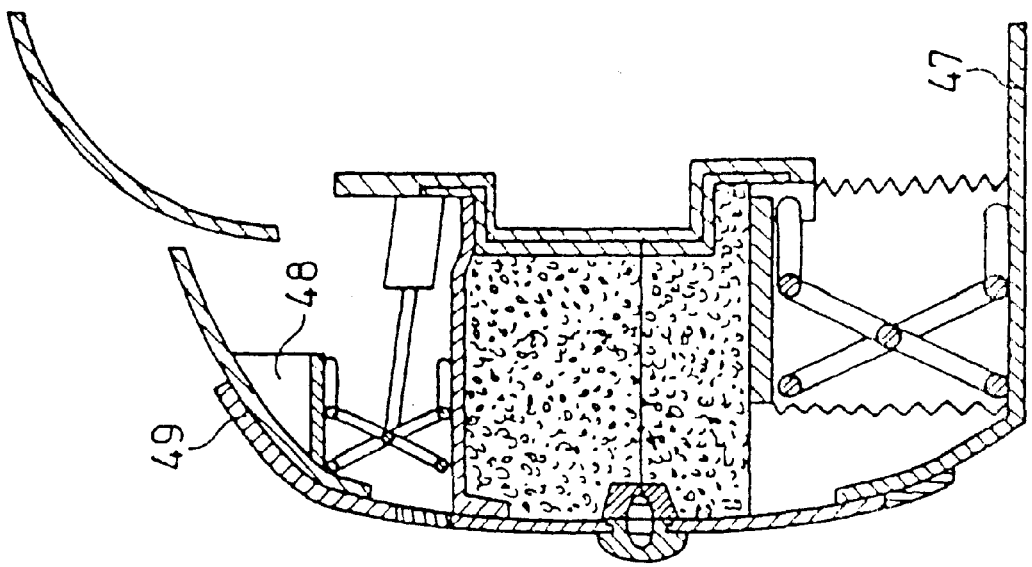
FIG. 2b is a sectional representation of the safety bumper of to FIG. 2a after an impact and deployment of the lifting systems.
Figure 2A:
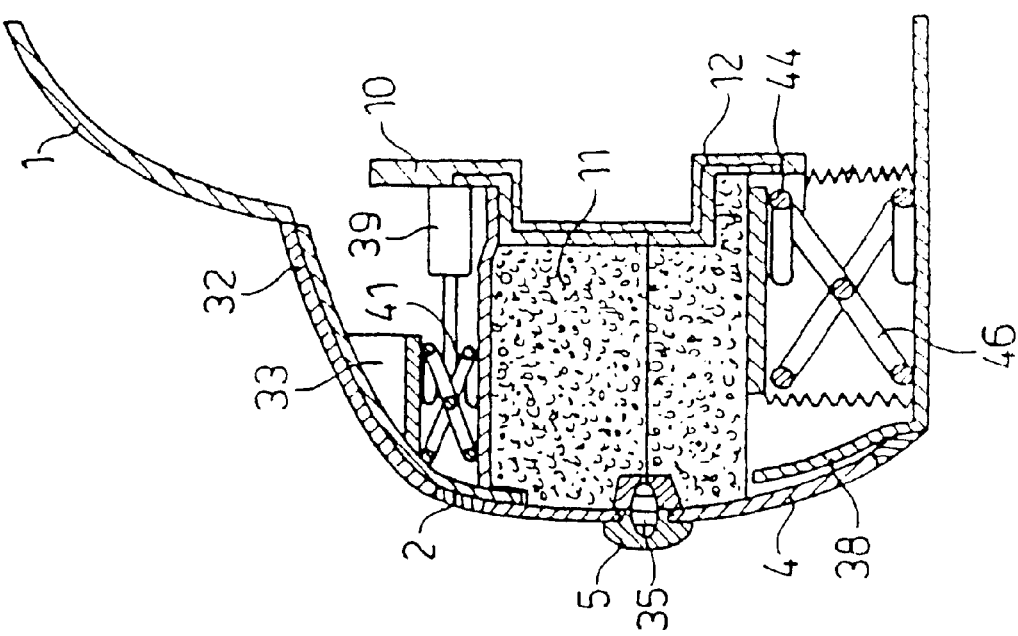
FIG. 2a is a sectional representation of a further safety bumper according to the invention with upper and lower lifting systems, and top and bottom sliding plates.

FIGS. 2*a* and 2*b* each show a cross section through an alternative safety bumper. FIG. 2*a* shows a bumper system, in which in the course of a collision a top lifting system 41 pushes a top flap 32 upwards (flap 49) and a bottom lifting system 46 pushes a bottom flap 38 downwards (flap 47).

Provided above the energy absorber 11 is a lifting apparatus 41, which carries the top sliding plate 33. The top sliding plate 33 is situated under the flap 32, which is movably connected by the elastic hinge 2 to the bumper basic body 4 and at its top end abuts the bonnet 1.

The bumper bar 5 with the impact sensor 35 is situated on the bumper basic body 4. Provided below the energy absorber (mounting) 11 is a bottom lifting apparatus 46, which carries the bottom sliding plate 47. The sensor 35 is connected by the electrical sensor lines 12 to a top and a bottom gas pressure cylinder 39 and 44, which effect the movement of the lifting apparatuses 41 and 46.

The displacement of the flaps 32 and 38 is triggered by the sensor 35 in the bumper bar 5 in a similar manner to the triggering of the airbag ignition in the bumper system according to Example 1.

The trigger signal is supplied via the sensor lines 12 to movable pressure cylinders 39 and 44. The latter effect the rapid movement of the lifting systems 41 and 46. Instead of the lifting systems 41 and 46 it is possible to use vertically installed pressure cylinders (not illustrated). A further possibility is displacement of the sliding plates 33 and 38 by means of expanding airbags (not shown).

The energy absorption in the middle part of the bumper is effected as in Example 1.

By virtue of the extending of the bottom flap 32 and the top flap 38 the buckling angle for an impacting body is kept below 15° and the shear distance is kept at less than 6 mm (see FIG. 2*b*).

The materials of the bumper basic body 4 and of the flaps 32 and 38 correspond to the materials described in Example 1 (PC/PBT mixture and polyalcohol formulation). The hinge 2 is made of TPU.

Example 3

Figure 3B:
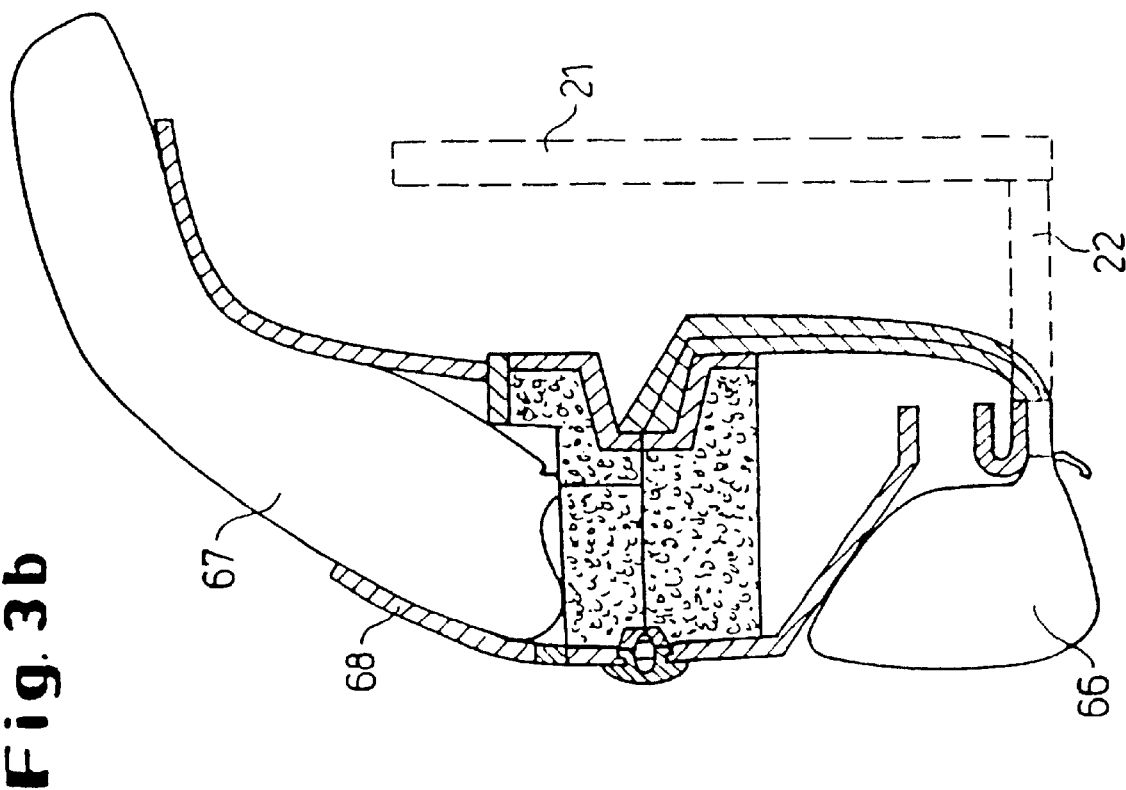
FIG. 3b is a sectional representation of the safety bumper of FIG. 3a after an impact and deployment of the air bags.
Figure 3A:
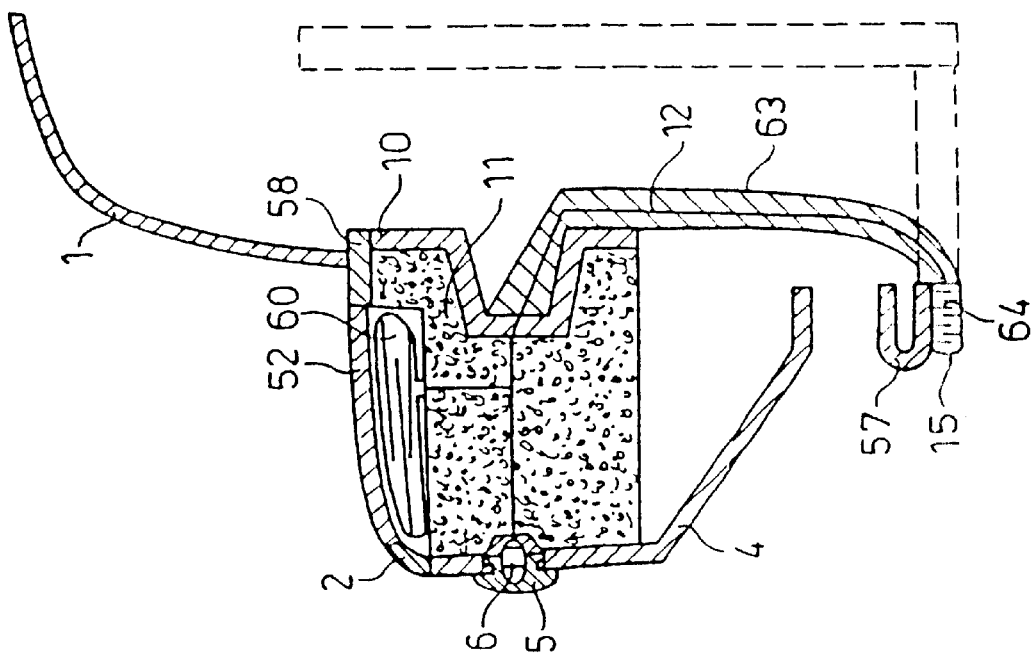
FIG. 3a is a sectional representation of a further safety bumper according to the invention with two airbags, in which the lower air bag is located beneath a lowermost part of the bumper.

FIGS. 3*a* and 3*b* each show a cross section of a further variant of the safety bumper. FIG. 3*a* shows a bumper system, in which in the course of a collision by means of a top and bottom airbag system 60 and 64 a top flap 68 (52) is opened and a uniform impact front is formed.

Provided above the energy absorber 11 is a top airbag system 60, which is seated below the top flap 68. The top flap 68 is movably connected by the elastic hinge 2 (made of TPU) to the bumper basic body 4 (made of a PC/PBT mixture) and at its top end abuts the ornamental moulding 58 below the bonnet 1.

The bumper bar 5 with the impact sensor 6 is situated on the bumper basic body 4. Provided below the energy absorber 11 is a bottom airbag apparatus 64, which is disposed under the bottom set-back part of the bumper basic body 4. The sensor 6 is connected by the electrical sensor lines 12 to the top airbag system 60 and the bottom airbag system 64. The bottom airbag system 64 is mounted on the bottom end of a bar 63, which carries the entire bumper and the bottom, externally visible part 57 of the bumper. Situated above the part 57 is an air inlet opening.

For the additional support of the airbag 66 and transmission of impact energy a further connecting bar 22 may be installed from the airbag 66 to the front end 21 of the car.

The ignition of the igniters of the top airbag system 60 and bottom airbag system 64 is triggered by the sensor 6 in the bumper bar 5 in a similar manner to the triggering of the airbag ignition in the bumper system according to Example 1.

The trigger signal is supplied via the sensor lines 12 to the airbag systems 60 and 64.

The energy absorption in the middle part of the bumper is effected in the manner illustrated in Example 1.

By virtue of the expansion of the top airbag 67 the flap 52 is opened—in a comparable manner to opening of the top flap in Example 1.

In the bottom part the expanded airbag 66 fills the bumper contour in such a way that a uniform, kink-free front is produced. By said means and by means of the top airbag 67 combined with the flap 52 the buckling angle of the entire impact front is kept below 15° and the shear distance is kept at less than 6 mm (see FIG. 3*b*).

Support of the bottom airbag 66 is effected in a comparable manner to Example 1 via a plastic/metal composite structure (polyamide/sheet steel) attached to the cross-bar 10 or to the front end 21.

In the event of a crash, an anti-overload device in the optionally additionally provided connecting bar 22 provides protection against the destruction or damage of built-on parts.

What is claimed is:

1. A safety bumper for a motor vehicle comprising:
   (a) a bumper basic body having a forward surface;
   (b) a bumper bar;
   (c) a mounting member;
   (d) a cross-bar of the vehicle, said bumper bar being connected to said bumper basic body and extending through to the forward surface of said bumper basic body, said bumper bar also being connected to said mounting member, said mounting member being located behind said bumper basic body and said bumper bar, said mounting member being connected to said cross-bar, said cross-bar being located behind said mounting member;
   (e) at least one of a deployable energy-absorbing element positioned above said mounting member and a deployable energy-absorbing element positioned below said mounting member; and
   (f) an impact sensor located in said bumper bar,
wherein said deployable energy-absorbing element is controlled by said impact sensor, upon actuation by said impact sensor said deployable energy-absorbing element is deployed and forms a substantially continuous contour and a substantially common front with the forward surface of said bumper basic body.

2. The safety bumper of claim 1 wherein said deployable energy-absorbing element positioned above said mounting member is an air bag in a folded-up state, said air bag being located beneath a moveable top bumper flap, said air bag comprising an igniter, and said igniter being electrically connected by a control line to said impact sensor, upon actuation of said igniter by said impact sensor the air bag deploys and together with said moveable top bumper flap forms a substantially continuous contour and a substantially common front with the forward surface of said bumper basic body.

3. The safety bumper of claim 1 wherein said deployable energy-absorbing element positioned above said mounting member comprises a lifting system connected to a drive, said lifting system residing behind a sliding plate which abuts a moveable top bumper flap, said drive being connected electrically by a control line to said impact sensor, upon actuation of said drive by said impact sensor the lifting system deploys and together with said sliding plate and said moveable top bumper flap forms a substantially continuous contour and a substantially common front with the forward surface of said bumper basic body.

4. The safety bumper of claim 1 wherein said deployable energy-absorbing element positioned below said mounting member is an air bag in a folded-up state, said air bag being located beneath a lowermost part of said bumper, said air bag comprising an igniter, and said igniter being electrically connected by a control line to said impact sensor, upon actuation of said igniter by said impact sensor the air bag deploys and forms a substantially continuous contour and a substantially common front with the forward surface of said bumper basic body.

5. The safety bumper of claim 1 wherein said deployable energy-absorbing element positioned below said mounting member is an air bag in a folded-up state, said air bag being located beneath a moveable bottom bumper flap, said air bag comprising an igniter, and said igniter being electrically connected by a control line to said impact sensor, upon actuation of said igniter by said impact sensor the air bag deploys and together with said moveable bottom bumper flap together forms a substantially continuous contour and a substantially common front with the forward surface of said bumper basic body.

6. The safety bumper of claim 1 wherein said deployable energy-absorbing element positioned below said mounting member comprises a lifting system connected to a drive, said lifting system residing behind a bottom sliding plate which is positioned under and abuts said bumper basic body, said drive being connected electrically to said impact sensor by a control line, upon actuation of said drive by said impact sensor the lifting system deploys and together with said bottom sliding plate forms a substantially continuous contour and a substantially common front with the forward surface of said bumper basic body.

7. The safety bumper of claim 3 wherein the drive connected to said lifting system of said deployable energy-absorbing element positioned above said mounting member is at least one of a gas pressure cylinder and a hydraulic cylinder.

8. The safety bumper of claim 6 wherein the drive connected to said lifting system of said deployable energy-absorbing element positioned below said mounting member is at least one of a gas pressure cylinder and a hydraulic cylinder.

9. The safety bumper of claim 2, 3 or 4 wherein said moveable bumper flap comprises a flexible plastic hinge connected to said bumper basic body.

10. The safety bumper of claim 9 wherein said flexible plastic hinge is fabricated from a material selected from thermoplastic polyethylene and thermoplastic polyurethane.

11. The safety bumper of claim 1 wherein said mounting member is one of a stationary energy-absorbing plastic foam body and a stationary energy-absorbing plastic strut body.

12. The safety bumper of claim 11 wherein said stationary energy-absorbing plastic foam body is fabricated from a material selected from polyurethane foam, polystyrene foam and polypropylene foam.

13. The safety bumper of claim 1 wherein said deployable energy-absorbing element is connected by means of a supporting strut to a front end of the motor vehicle.

14. The safety bumper of claim 1 wherein said impact sensor can actuate said deployable energy-absorbing element only when said motor vehicle is traveling a at speeds of at least 8 kph.

15. The safety bumper of claim 1 wherein said impact sensor can actuate said deployable energy-absorbing element only when said motor vehicle is traveling a at speeds of at least 10 kph.

16. The safety bumper of claim 1 wherein said mounting member is a stationary energy-absorbing mounting member.

17. The safety bumper of claim 1 wherein the deployed energy-absorbing element together with the forward surface of said bumper basic body provide a buckling angle of less than 15°.

* * * * *